United States Patent
Böhnke

(10) Patent No.: US 6,546,107 B1
(45) Date of Patent: Apr. 8, 2003

(54) METHOD AND APPARATUS FOR CONTROLLING THE PROPAGATION OF MAGNETIC FIELDS BY ELECTRODYNAMIC/MAGNETIC TRANSDUCERS IN TELECOMMUNICATION DEVICES

(75) Inventor: Gerd Böhnke, Bottrop (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/530,436

(22) PCT Filed: Nov. 21, 1997

(86) PCT No.: PCT/DE97/02739
§ 371 (c)(1),
(2), (4) Date: Apr. 28, 2000

(87) PCT Pub. No.: WO99/22550
PCT Pub. Date: May 6, 1999

(30) Foreign Application Priority Data

Oct. 28, 1997 (DE) .......................................... 197 47 562

(51) Int. Cl.⁷ ................................................ H04R 25/00
(52) U.S. Cl. ...................................... 381/189; 361/818
(58) Field of Search ................................ 316/814, 816, 316/818; 381/189, 190, 191, 391, 393; 455/117, 350, 575

(56) References Cited

U.S. PATENT DOCUMENTS 4,272,654 A   6/1981   Carlson ...................... 117/119
4,430,520 A * 2/1984   Tibbetts et al. ............. 381/189
4,529,846 A * 7/1985   Freeman et al. ............ 381/406
4,596,147 A * 6/1986   Behl et al. ..................... 73/643

FOREIGN PATENT DOCUMENTS

| DE | 34 01 072 A1 | 7/1985 | .......... G01N/29/04 |
| EP | 0 422 424 A2 | 4/1991 | ............ H04R/9/10 |
| EP | 0 802 612 A2 | 10/1997 | .......... H02K/21/14 |

* cited by examiner

Primary Examiner—Curtis Kuntz
Assistant Examiner—Brian Ensey
(74) Attorney, Agent, or Firm—Bell Boyd & Lloyd LLC

(57) ABSTRACT

A method and apparatus for improving the propagation of magnetic fields by electrodynamic/magnetic transducers, particularly in telecommunication devices, such that static magnetic fields produced by the transducers are substantially shielded and dynamic magnetic fields are radiated in a substantially unimpeded manner, a magnetic cover which is substantially impermeable to static magnetic fields from an electrodynamic/magnetic transducer is used at least in the sound exit region of the transducer. The cover has a number of openings passing through it which are designed such that the cover provided with the openings still has a predetermined strength or stiffness with respect to its original strength or stiffness and is still mechanically mountable, the openings letting through a predetermined sound pressure level which can be produced by the transducer, and the openings spatially delimiting eddy currents on the cover which are produced by dynamic magnetic fields from the transducer, meaning that these eddy currents cannot develop to full strength.

14 Claims, 3 Drawing Sheets

METHOD AND APPARATUS FOR CONTROLLING THE PROPAGATION OF MAGNETIC FIELDS BY ELECTRODYNAMIC/MAGNETIC TRANSDUCERS IN TELECOMMUNICATION DEVICES

BACKGROUND OF THE INVENTION

1. Field of the Invention

The present invention relates to both a method and an apparatus for controlling the propagation of magnetic fields by electrodynamic/magnetic transducers, in telecommunication devices wherein static magnetic fields produced by the transducers are substantially shielded and dynamic magnetic fields are radiated in a substantially unimpeded manner.

2. Description of the Prior Art

Electrodynamic/magnetic transducers which are a subgroup of electroacoustic transducers, are used wherever electrical or electronic signals are to be converted into speech and/or speech is to be converted into electrical or electronic signals. Typical fields of use are, therefore, the audio and hi-fi field, domestic engineering in areas where alarm and bell signals are output, and telecommunications engineering, for example.

In the latter field of use, the electrodynamic transducers are particularly used, for example, in handsets (cord-connected, cordless—e.g., mobile parts and mobile phones), headphones and headsets, usually in the form of earphones, but also sometimes in the form of a microphone. The use of electromagnetic transducers is less common.

A big disadvantage of these transducer types, particularly the electrodynamic transducers, is that they produce, as shown in FIG. 1 (showing a basic sketch of an electrodynamic transducer a), static magnetic fields (stray fields) $MF_s$ as a result of a pot magnet TM, for example, wherein the magnetic fields penetrate non-magnetic materials (plastics) unimpeded. Magnetizable objects such as pins, paperclips, iron filings, particles (in industries which use iron or steel, metalworking shops, etc., are inevitably attracted toward the center of the transducer. If the particles are small enough to pass through the (voice inlet) voice outlet openings, they collect at the place of greatest field strength (clearance of the pot magnet TM) and permanently jam a diaphragm MB of the transducer. Depending on how sensitive the diaphragm MB, is and hence the transducer as such, toward such mini foreign bodies, the result is either an abrupt total failure or a gradual failure of the diaphragm MB.

Furthermore, the relative movement of the handset in the vicinity of electrical conductors, particularly inductors, results in unwanted induced currents (a key issue regarding cardiac pacemakers, medical devices etc.).

As a result of the devices being miniaturized (e.g., characterized by a short distance between the transducer's sound exit opening and the sound exit opening in the housing of the handset; cf. FIG. 1), smaller and smaller cordless mobile parts or mobile radio phones are becoming available on the market. However, problems are intensifying because "rare earth" magnets (such as magnets made of Nd or Sm alloys) with relatively high remanences, and, hence, relatively strong stray fields, are frequently being used in flat and small transducers.

The result of the problems outlined is, on the one hand, in some countries (e.g., Australia, Great Britain, USA) licensing requirements limit the static magnetic field. On the other hand, there recently has been an increased number of cases, particularly with GSM mobile phones, arising from earphones having failed on account of jammed diaphragms. Although fine-meshed tissue (e.g., dust webs) in the acoustic openings prevent the diaphragm from becoming jammed, they clogged over time such that reproduction became continuously quieter as the magnetic force is permanently exerted on the magnetizable particles contained in the tissue.

To solve this problem, electrets and piezoelectric microphones, which represent equivalent alternatives, are called upon for implementing the microphones in the handsets.

The situation is different, however, for implementing the earphones.

Piezoelectric transducers used as earphones have no pronounced magnetic field. However, the transducer technology based on the piezoelectric effect has two clear disadvantages as compared with the transducer technology based on a magnetic field: 1) From the point of view of speech quality, electrodynamic transducers, particularly with small diameters, are clearly superior; 2) Some countries (e.g., Australia, Great Britain, USA, Italy) and, in addition, British Telecom and France Telecom, generally have the requirement of "hearing aid compatibility" (hac) for stimulating hearing aids. This stimulation is (virtually) exclusively inductive and is based on a dynamic magnetic field (alternating field). This means that the required (measurement of the alternating field in an hac measurement plane as shown in FIG. 1) magnetic alternating field needs to be produced using cumulative supplementary coils.

Thus, in the end, the electrodynamic ransducers, in particular, are again called upon after all and, at the same time, attempts are made to solve the aforementioned problem in a different way.

When electrodynamic transducers are used, it is naturally helpful, for reducing the static stray fields, to have a relatively large distance between the transducer's sound exit opening and the surface of the handset as has been done, for example, in the, handset of the cord-connected Siemens "Symphony D" devices available on the market. However, this procedure is absolutely contrary to the market requirements of smaller and smaller handsets, particularly mobile (cordless) handsets. To solve this problem, the "transducer's sound exit opening ≤ surface of the handset" distance would have to be approximately 1 cm. This would allow the aforementioned negative influences of the static magnetic field to be eliminated.

However, by increasing the distance, a dynamic magnetic field $MF_d$ (as shown in FIG. 2—a basic sketch of an electrodynamic transducer), which is needed on account of the hac requirement and is also large enough given proficient dimensioning of a plunger-type coil TS which produces this dynamic magnetic field $MF_d$, in conventional electrodynamic transducers, is also attenuated to such an extent that it is no longer sufficient for the hac requirement. This means that additional air-core coils are again necessary here, too, to amplify the alternating field.

Taking FIG. 1 as a basis, a cover AD (shield, e.g.,) in the form of a shielding plate) is therefore used, as shown in FIG. 3, in a familiar manner. This cover concentrates the field lines of the stray field $MF_s$ and allows them less projection into space. The cover must, of course, be provided with openings to be "transparent" to the sound pressure produced by the diaphragm MB. The magnetic alternating fields $MF_d$ (cf. FIG. 2) for the hac requirement are consequently attenuated again, however, and therefore need to be produced with supplementary coils fitted in front of the cover.

EP 0 422 424 A2 discloses an electrodynamic transducer with improved electrical and magnetic shielding, which has a moving coil, a diaphragm and a magnet system which are surrounded by a housing with a cover. Clamped between the inside of the cover and the internal pole plate of the magnet system, there is an insert which is made of a nonmagnetizable, electrically insulating material. The insert defines the axial position of the magnet system with respect to the cover, and the cover shields external magnetic alternating fields and has openings which let through a sound pressure.

DE 3 401 072 A1 discloses an electrodynamic transducer head for nondestructive testing of workpieces using ultrasound, wherein the transducer head has an electromagnet which has a magnetic yoke and includes an outer pole shoe and an inner pole shoe surrounded by the latter. These pole shoes have exciter and reception coils arranged on them. To allow the inner pole shoe to be placed directly on the workpiece, moving relative to the latter, without any risk, these exciter and reception coils are provided with a protective cap which is surrounded by a protective ring whose end face facing the workpiece projects over that of the protective cap, the inner pole shoe and/or the protective cap having radially extending slits for preventing eddy currents, and the slits letting through a sound pressure.

An object to which the present invention is directed is that of improving the propagation of magnetic fields by electrodynamic/magnetic transducers, particularly in telecommunication devices, such that static magnetic fields produced by the transducers are substantially shielded and dynamic magnetic fields are radiated in a substantially unimpeded manner.

SUMMARY OF THE INVENTION

The idea on which the present invention is based is that of providing a magnetic cover (shield), e.g. for technical production reasons, in the form of a shielding plate or deep-drawn plate which is substantially impermeable to static magnetic fields from an electrodynamic/magnetic transducer, at least in the sound exit region of the transducer. The cover can be inserted, for example while the transducer is being mounted between the housing which surrounds the transducer (e.g., the handset shell) and the transducer, or it can be premounted on the transducer in the form of a pot.

The cover has a number of openings passing through the cover, the number of openings being designed to be such that;
(1) the cover provided with the openings still has a predetermined strength or stiffness with respect to its original strength or stiffness and is, thus, still mechanically mountable;
(2) the openings let through a sound pressure level which can be produced by the transducer; and
(3) the openings spatially delimit eddy currents on the cover which are produced by dynamic magnetic fields from the transducer, which means that these eddy currents cannot develop to full strength.

In summary, the cover includes a particular combination of geometric and magnetic material properties.

In an embodiment of the present invention the spatial delimitation can be achieved in that the openings cross the eddy currents which would be induced without them in the cover.

In terms of type and number, the openings fulfill the listed criteria (1) . . . (3) quite well, in an alternative embodiment particularly when they are arranged or run substantially radially on the cover.

In another embodiment, it is advantageous if the cover is slit; that is if the openings are in the form of slits, for example.

For the arrangement of the openings on the cover, it is advantageous if the opening(s) are arranged in the center of the covers on account of the concentration properties of eddy currents (concentration of eddy currents), particularly with rotationally symmetrical covers.

In accordance with a further embodiment, at least one of the slits is substantially the same length as the length of the cover at its maximum extent.

pursuant to yet another embodiment it is advantageous if the magnetic cover is soft magnetic, or has a low coercive force.

Introducing a magnetic material into a magnetic field, as in the present case, for example, produces a gain in the dynamic magnetic field component present in the magnetic field if the substance of the material (in the present case the substance of the cover) with regard to the magnetic field containing the material is coordinated with one another such that, under these circumstances, the point under consideration is the steepest rise in the new curve for the hysteresis curve. In the present case (use of, in particular, electrodynamic transducers in telecommunication terminals, where the dynamic magnetic field produced by the plunger-type coil in the dynamic transducer is utilized for stimulating hearing aids (the key issue being hearing aid compatibility), this gain is therefore desirable because it means that other measures for amplifying the dynamic magnetic field, e.g. using additional air-core coils, are not necessary.

In another embodiment of the present invention it is therefore advantageous if the magnetic cover is made of a material such that, with the predetermined magnetic field from the transducer, a maximum gain is produced for the dynamic magnetic field let through by the cover.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 3:
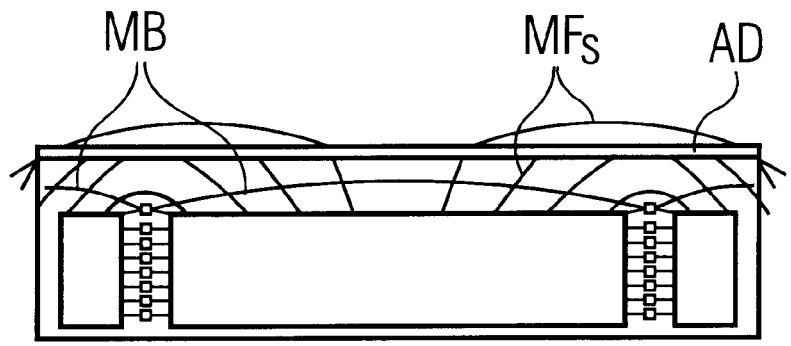
FIG. 3 shows a shielded cover which is known for telecommunication devices.
Figure 4:
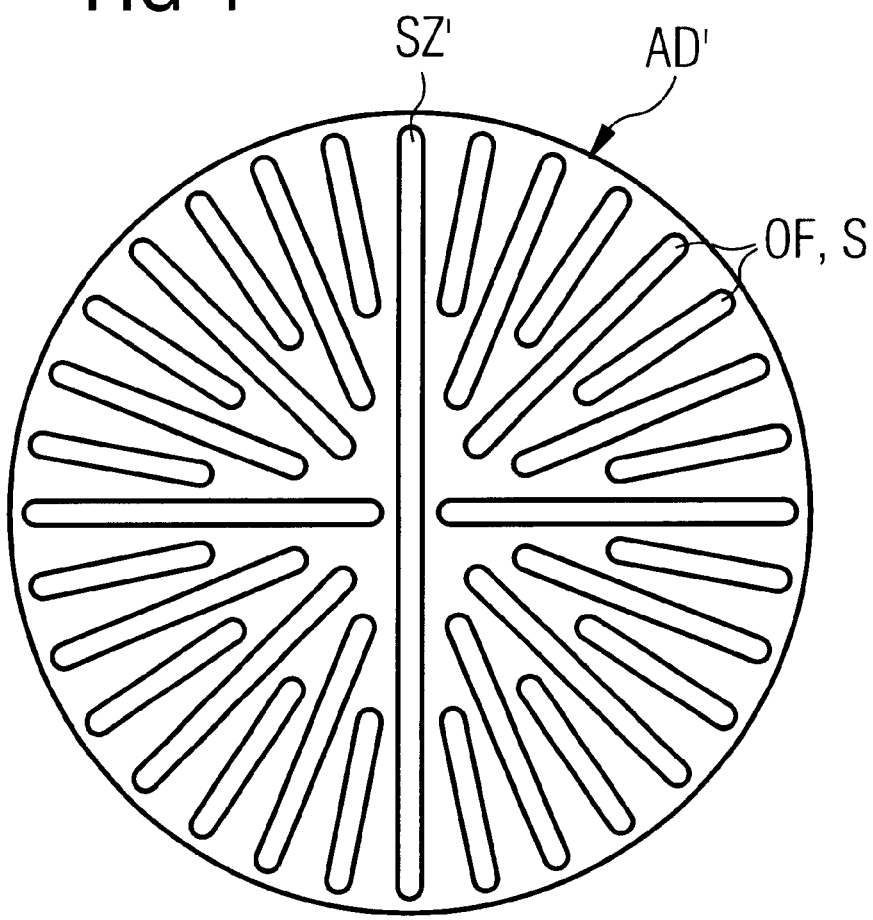
FIG. 4 shows a specific embodiment of the cover of the present invention, on the basis of FIG. 3.

FIG. 4 shows, in contrast to the cover AD shown in FIG. 3, a specific cover AD' which is of rotationally symmetrical design, for example. The cover AD' can be inserted, while the transducer is being mounted, between the handset shell and the transducer. Alternatively, it can be premounted on the transducer in the form of a pot. The particular feature about the cover Ad' is a combination of geometric and magnetic material properties.

Arranging openings OF, which are in the form of slits SZ, for example, as radially as possible ensures that eddy currents produced by the magnetic alternating field from the plunger-type coil of the transducer are reduced on the cover Ad' or in the plane of the drawing. Furthermore, the reduction can be improved further if at least one slit SZ' of the slits SZ runs through the center of the cover Ad'. According to Lenz's law (three finger law), the original alternating field is now attenuated only slightly by the remaining eddy currents. The cover Ad' preferably should be made of a soft magnetic material which, as shown in FIG. 5, is coordinated with a magnetic field strength $H_{TM}$ produced by the transducer's pot magnet at the location of the cover Ad'.

Figure 5:
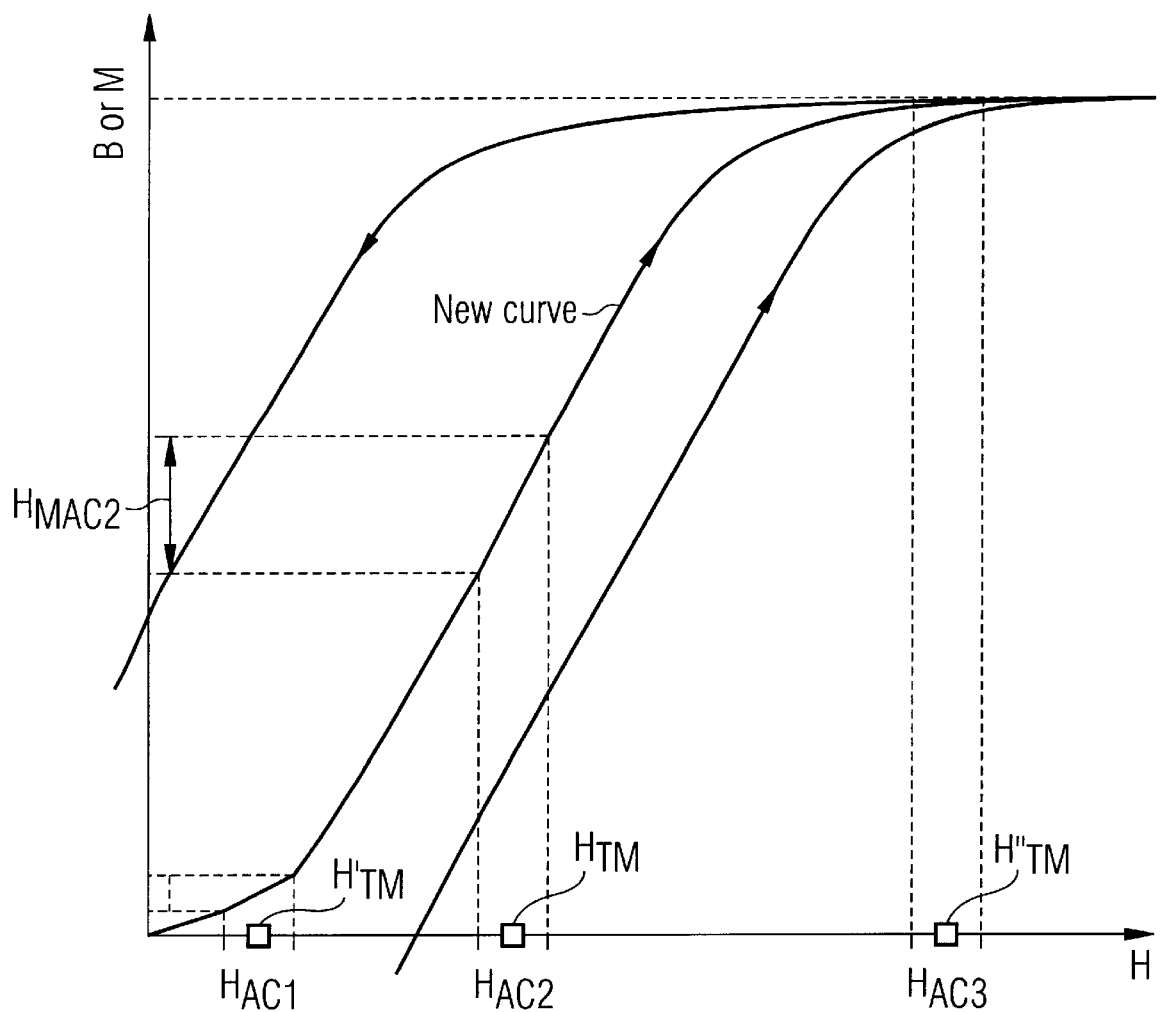
FIG. 5 shows a hysteresis curve associated with the present invention.

As shown in FIG. 5, the plunger-type coil TS now produces a cumulative alternating field $H_{AC2}$. With the correct choice of material, the point under consideration is the steepest rise in the new curve for the hysteresis, and significant AC remagnetization $M_{AC2}$ is produced in the direction perpendicular to the plane of the cover. If the field strength $H_{TM}$ relative to the hysteresis has been chosen to be too small (a field strength $H'_{TM}$ with a cumulative alternating field $H_{AC1}$) or too large (a field strength $H''_{TM}$ with a cumulative alternating field $H_{AC3}$), the alternating field contribution as a result of remagnetization to the hac field is negligible. Only with the alternating field $H_{AC2}$ does the remagnetization $M_{AC2}$ of the cover Ad' produce an additional alternating field $H_{MC2}$ which overcompensates for the original alternating field $MF_d$ from the plunger-type coil TS—attenuated by the eddy current losses.

Figure 1:
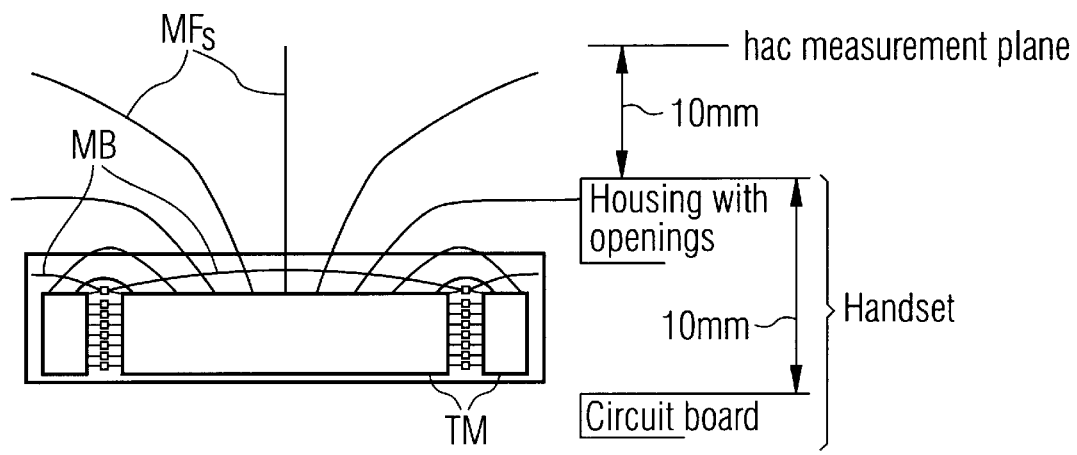
FIG. 1 shows a basic sketch of an electrodynamic transducer which is known in this field.
Figure 2:
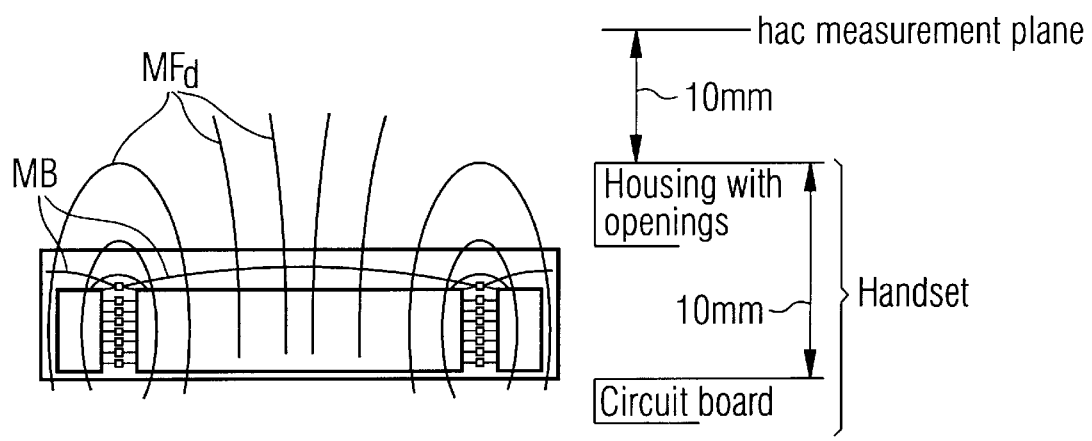
FIG. 2 shows another basic sketch of an electrodynamic transducer which is known.
Figure 6:
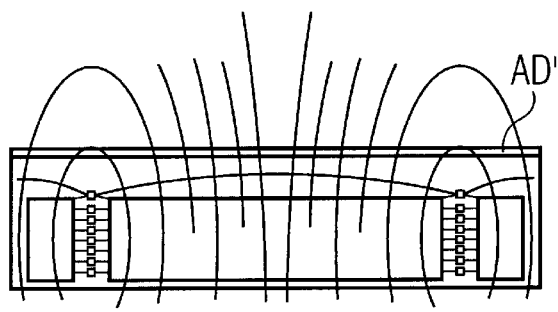
FIG. 6 shows a basic sketch of an electrodynamic transducer having an amplified dynamic magnetic field, on the basis of FIG. 2.

FIG. 6 shows this amplification phenomenon, on the basis of FIG. 2, using a basic sketch of the electrodynamic transducer. As compared with the illustration in FIG. 2, the dynamic magnetic field $MF_d$ shown in FIG. 6 has been amplified. This is conveyed by a greater number of field lines.

If the electrodynamic transducer is covered or shielded with the cover Ad', as described on the basis of measurements taken on handsets (mobile parts), the static magnetic field $MF_s$ at the surface of mobile parts can be reduced by approximately 87%, so that no kinds of iron filings, paperclips, pins, etc. can be attracted against the force of gravity any longer. At the same time, the hac field strength rose by approximately 200%.

The loss of volume from the transducer as a result of the cover Ad' was only approximately 18%, which easily is compensated for by increasing the gain of the speech circuit by approximately 1.5 dB.

Although the present invention has been described with reference to specific embodiments, those of skill in the art will recognize that changes may be made thereto without departing from the spirit and scope of the invention as set forth in the hereafter appended claims.

I claim:

1. A method for controlling the propagation of magnetic fields by an electrodynamic/magnetic transducer in a telecommunication device, the method comprising the steps of:

covering the electrodynamic/magnetic transducer at least in a sound exit region by a cover which has a plurality of openings passing through the cover, the plurality of openings being arranged on the cover such that the cover maintains a strength necessary for mechanical mounting, and the cover being magnetic and impermeable to static magnetic fields;

allowing a sound pressure level which may be produced by the electrodynamic/magnetic transducer to pass through the plurality of openings; and spatially delimiting, via the plurality of openings, eddy currents on the cover which are produced by dynamic magnetic fields from the electrodynamic/magnetic transducer.

2. A method for controlling the propagation of magnetic fields by an electrodynamic/magnetic transducer in a telecommunication device as claimed in claim 1, wherein the plurality of openings cross the eddy currents which are induced without the plurality of openings in the cover.

3. A method for controlling the propagation of magnetic fields by an electrodynamic/magnetic transducer in a telecommunication device as claimed in claim 1, the method further comprising the step of:

arranging the plurality of openings in a substantially radial manner on the cover.

4. A method for controlling the propagation of magnetic fields by an electrodynamic/magnetic transducer in a telecommunication device as claimed in claim 1, the method further comprising the step of:

forming the plurality of openings as slits.

5. A method for controlling the propagation of magnetic fields by an electrodynamic/magnetic transducer in a telecommunication device as claimed in claim 4, the method further comprising the step of:

forming at least one of the slits with substantially a same length as a length of the cover at a maximum extent.

6. A method for controlling the propagation of magnetic fields by an electrodynamic/magnetic transducer in a telecommunications device as claimed in claim 1, the method further comprising the step of:

forming the cover from soft magnetic material.

7. A method for controlling the propagation of magnetic fields by an electrodynamic/magnetic transducer in a telecommunication device as claimed in claim 1, the method further comprising the step of:

forming the cover from a material such that, given the static and dynamic magnetic fields from the electrodynamic/magnetic transducer, a maximum gain is produced for the dynamic magnetic field allowed through by the cover.

8. An apparatus for controlling the propagation of magnetic fields by an electrodynamic/magnetic transducer in a telecommunication device, comprising a cover for covering the electrodynamic/magnetic transducer at least in a sound exit region, the cover being magnetic and impermeable to static magnetic fields, the cover having a plurality of openings which pass through the cover, the plurality of openings allowing a sound pressure level which may be produced by the electrodynamic/magnetic transducer to pass through, the plurality of openings being arranged on the cover such that the cover maintains a strength necessary for mechanical mounting, and the plurality of openings spatially delimiting eddy currents on the cover which are produced by dynamic magnetic fields from the electrodynamic/magnetic transducer.

9. An apparatus for controlling the propagation of magnetic fields by an electrodynamic/magnetic transducer in a telecommunication device as claimed in claim 8, wherein the plurality of openings are formed such that the eddy currents which are induced without the plurality of openings in the cover are crossed.

10. An apparatus for controlling the propagation of magnetic fields by an electrodynamic/magnetic transducer in a telecommunication device as claimed in claim 8, wherein the plurality of openings are arranged in a substantially radial manner on the cover.

11. An apparatus for controlling the propagation of magnetic fields by an electrodynamic/magnetic transducer in a telecommunication device as claimed in claim 8, wherein the plurality of openings are formed as slits.

12. An apparatus for controlling the propagation of magnetic fields by an electrodynamic/magnetic transducer in a telecommunication device as claimed in claim 11, wherein at least one slit has substantially a same length as a length of the cover at a maximum extent.

13. An apparatus for controlling the propagation of magnetic fields by an electrodynamic/magnetic transducer in a telecommunication device as claimed in claim 8, wherein the cover is formed from soft magnetic material.

14. An apparatus for controlling the propagation of magnetic fields by an electrodynamic/magnetic transducer in a telecommunication device as claimed in claim 8, wherein the cover is formed from a material such that, given the static and dynamic magnetic fields from the electrodynamic/magnetic transducer, a maximum gain is produced for the dynamic magnetic field allowed through by the cover.

* * * * *